United States Patent [19]

Moshonas

[11] Patent Number: 5,671,660
[45] Date of Patent: Sep. 30, 1997

[54] HEATED AIR-CIRCULATING OVEN

[76] Inventor: Georges Moshonas, 12240 Camille, Montréal Québec, Canada, H4K 2H7

[21] Appl. No.: 680,527

[22] Filed: Jul. 9, 1996

Related U.S. Application Data

[62] Division of Ser. No. 354,256, Dec. 12, 1994, Pat. No. 5,584,237.

[51] Int. Cl.⁶ .............................. A23L 3/00; A21B 1/00; F27B 9/04; F27B 9/28
[52] U.S. Cl. .............. 99/443 C; 99/386; 99/476; 99/477; 126/21 A; 219/388; 219/400
[58] Field of Search ............... 99/339, 340, 357, 99/386, 401, 446–450, 473–476, 483, 443 R, 443 C; 219/388, 400; 126/21 A, 39 D; 432/59, 145, 144, 152, 176; 34/224, 229

[56] References Cited

U.S. PATENT DOCUMENTS

| | | | |
|---|---|---|---|
| 4,204,006 | 5/1980 | Emgard et al. | 426/520 |
| 4,462,383 | 7/1984 | Henke et al. | 126/21 A |
| 4,474,498 | 10/1984 | Smith | 432/144 |
| 4,503,760 | 3/1985 | Pryputsch et al. | 99/447 |
| 4,753,215 | 6/1988 | Kaminski et al. | 126/21 A |
| 4,813,398 | 3/1989 | Savage | 126/21 A |
| 4,965,435 | 10/1990 | Smith | 219/388 |
| 5,131,841 | 7/1992 | Smith et al. | 126/21 A |
| 5,180,898 | 1/1993 | Alden et al. | 219/388 |
| 5,205,274 | 4/1993 | Smith et al. | 99/474 X |
| 5,277,105 | 1/1994 | Bruno et al. | 99/443 C |
| 5,394,791 | 3/1995 | Vallee | 99/427 |
| 5,398,666 | 3/1995 | Smith et al. | 99/423 |
| 5,423,248 | 6/1995 | Smith et al. | 99/443 C |
| 5,584,237 | 12/1996 | Moshonas | 99/443 C |

*Primary Examiner*—Timothy F. Simone
*Attorney, Agent, or Firm*—ROBIC

[57] ABSTRACT

A heated air-circulating oven is disclosed, having a baking chamber in open communication with one or more suction chambers. One or more blowers draw air from the baking chamber through the suction chambers. The drawn air then passes through a blowing chamber and through a plurality of blown air distributors in open communication with the baking chamber so as to reinject the air drawn and blown by the blowers back into the baking chamber. The oven also has a heater external to the baking chamber so as to heat the air drawn by the blowers.

5 Claims, 8 Drawing Sheets

HEATED AIR-CIRCULATING OVEN

CROSS REFERENCE TO RELATED APPLICATION

This is a division of my U.S. patent application, Ser. No. 08/354,256, filed on Dec. 12, 1994, now U.S. Pat. No. 5,584,237.

BACKGROUND OF THE INVENTION a) Field of the Invention

The present invention relates to a heated air-circulating oven.

More precisely, the invention relates to a heated air-circulating oven devised to reinject the circulating air back into the oven after it has been heated with external means.

b) Brief Description of the Prior Art

There is a great number of ovens presently in use, which comprise an air distribution system including one or more air distribution channels located in a baking chamber and one or more blowers for drawing air from the baking chamber and recycling the air at different locations within the same via the air distribution chambers.

In these known ovens, the air which is so recycled is heated exclusively within the baking chamber.

OBJECTS AND SUMMARY OF THE INVENTION

It is an object of the present invention to provide a heated air-circulating oven provided with a baking chamber and with means for circulating the air within this chamber, wherein the air drawn from the baking chamber is heated outside of the same prior to being reinjected into the chamber so as to enhance the heating performance of the oven and make the same much easier and cheaper to manufacture and maintain.

More particularly, the object of the present invention is to provide a heated air-circulating oven which comprises a baking chamber in which food can be inserted for baking. Preferably, the baking chamber has two opposite openings through which a food-receiving conveyor passes at a given speed to move the food to be baked inside the baking chamber.

The oven also comprises one or more air suction chambers in open communication with the baking chamber, and one or more blowers for drawing air from the baking chamber through the air suction chambers.

The oven further comprises a blowing chamber in open communication with the air suction chambers via the blower (s) and in which the air drawn by the at least one blower passes.

Furthermore, the oven comprises a plurality of blown air distributors in open communication with the blowing chamber and the baking chamber so as to reinject the air drawn and blown by the blower(s) back into the baking chamber.

Heating means external to the baking chamber are provided for heating the air which is drawn from the baking chamber before it is blown back into the baking chamber.

Preferably, each air suction chamber is in open communication with the baking chamber via a plurality of apertures positioned so as not to face the blown air distributors.

According to a first preferred embodiment of the invention, the heating means comprises a heating chamber operatively connected to one of the air suction chambers so as to heat the air drawn through this air suction chamber. In this embodiment, the oven further comprises two air suction chambers and the baking chamber has two opposite sidewalls, an end wall, a top wall and a bottom wall. One of the air suction chambers is adjacent to the bottom wall of the baking chamber and the heating chamber extends across and beneath this air suction chamber so as to heat the same by contact. The other suction chamber is adjacent to the top wall of the baking chamber. Both of the air suction chambers are in open communication with each other via at least one intermediate chamber adjacent to one of the opposite sidewalls. Both of the air suction chambers are also in open communication with the baking chamber via a plurality of apertures operatively positioned onto the top and bottom wall. The blowing chamber extends at least in part adjacent to the end wall. Finally, the blown air distributors extend within the baking chamber on the top and bottom walls thereof from the one opposite end wall to which the blowing chamber is adjacent, to the other opposite end wall. Each of the blown air distributors has a decreasing cross section over its length and is provided with a plurality of evenly spaced outlet openings. Preferably, in this embodiment, the oven comprises two blowers externally mounted onto opposite ends of the baking chamber. Each blower is operatively connected to the air suction chambers and to the blowing chamber.

According to a second preferred embodiment of the invention, the heating means comprises a heating chamber in open communication with the at least one suction chamber and operatively connected to the blowing chamber. In this embodiment, the air drawn by the blower passes into the heating chamber before it passes through the blowing chamber so as to heat the air which passes through the heating chamber. Preferably, in this second preferred embodiment, the oven comprises two air suction chambers and the baking chamber has two opposite end walls, a top wall and a bottom wall. One of the air suction chambers is adjacent to the bottom wall of the baking chamber and the other one is adjacent to the top wall of the baking chamber. The blowing chamber is adjacent to one of the opposite end walls. The blown air distributors extend within the baking chamber on the top and bottom walls thereof from the one opposite end wall to which the blowing chamber is adjacent, to the other opposite end wall. Each of the blown air distributors has a decreasing cross section over its length and is provided with a plurality of evenly spaced outlet openings.

In this second embodiment, the oven preferably comprises two blowers both mounted within the blowing chamber. One of the blowers is in communication with one suction chamber and the other blower is in communication with the other suction chamber.

Preferably, the heat inside the blowing chamber is generated by a gas conversion burner.

There are various advantages to the heated air-circulating oven according to the invention. First of all, the reinjected air increases the heating power of the oven. Moreover, because of the disposition of the suction chambers, the blowing chamber and the blowers, the oven is very compact and easily accessible for maintenance services.

Thanks to its structure, the heated air-circulating oven according to the invention allows fast and consistent baking at all times. This oven is ideal for pizza, pre-cooked meats, sea food, souffle and cookies cooking.

BRIEF DESCRIPTION OF THE DRAWINGS

In order to impart full understanding of the manner in which these objects of the invention are achieved, a non-restrictive description of preferred embodiments will now be given with reference to the appended drawings, wherein.

In the following description and in the drawings, the same reference numerals will refer to the same structural elements.

DESCRIPTION OF THE PREFERRED EMBODIMENTS

Figure 1:
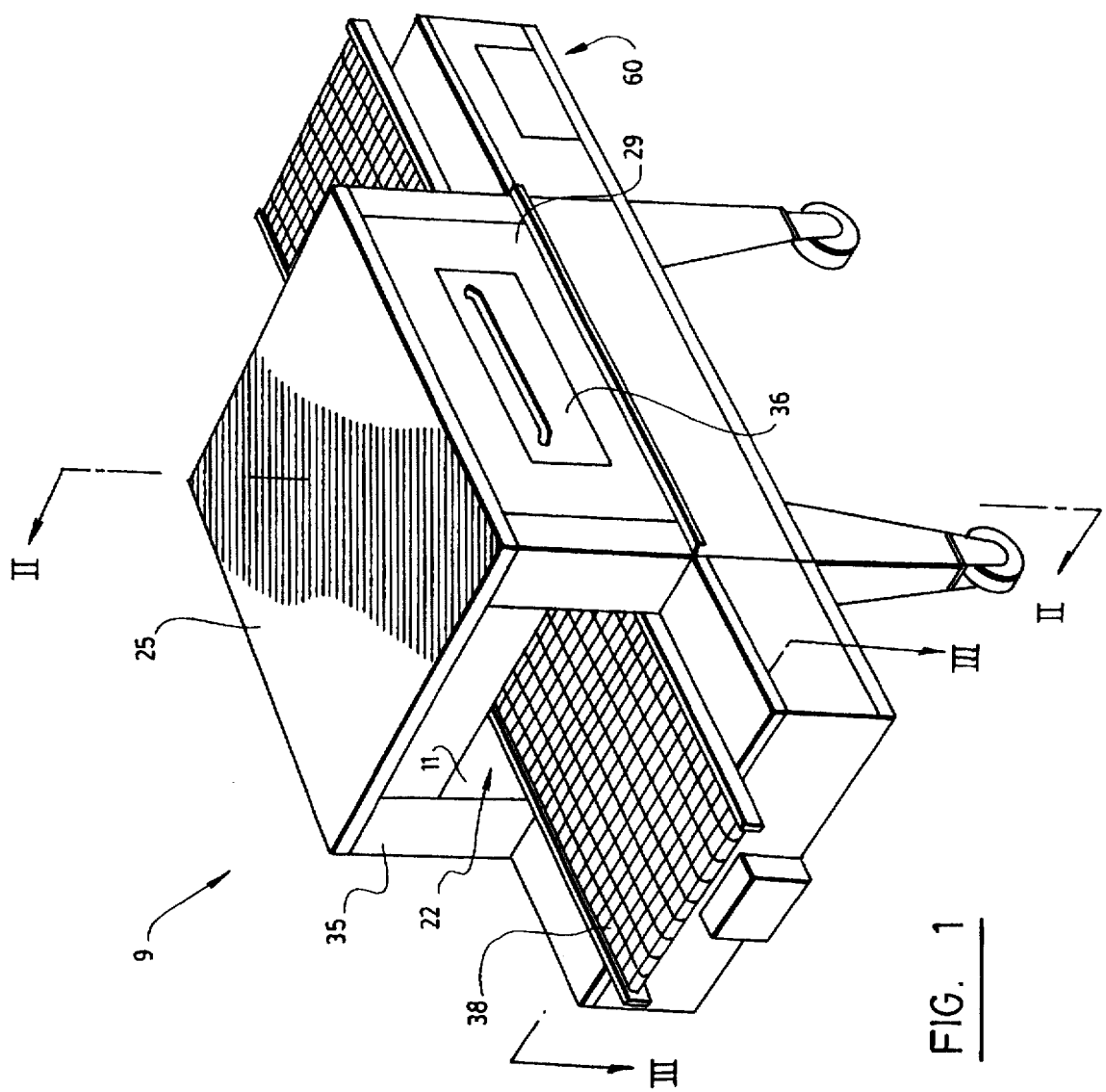
FIG. 1 is a perspective view of a heated air-circulating oven according to a first preferred embodiment of the invention.
Figure 2:
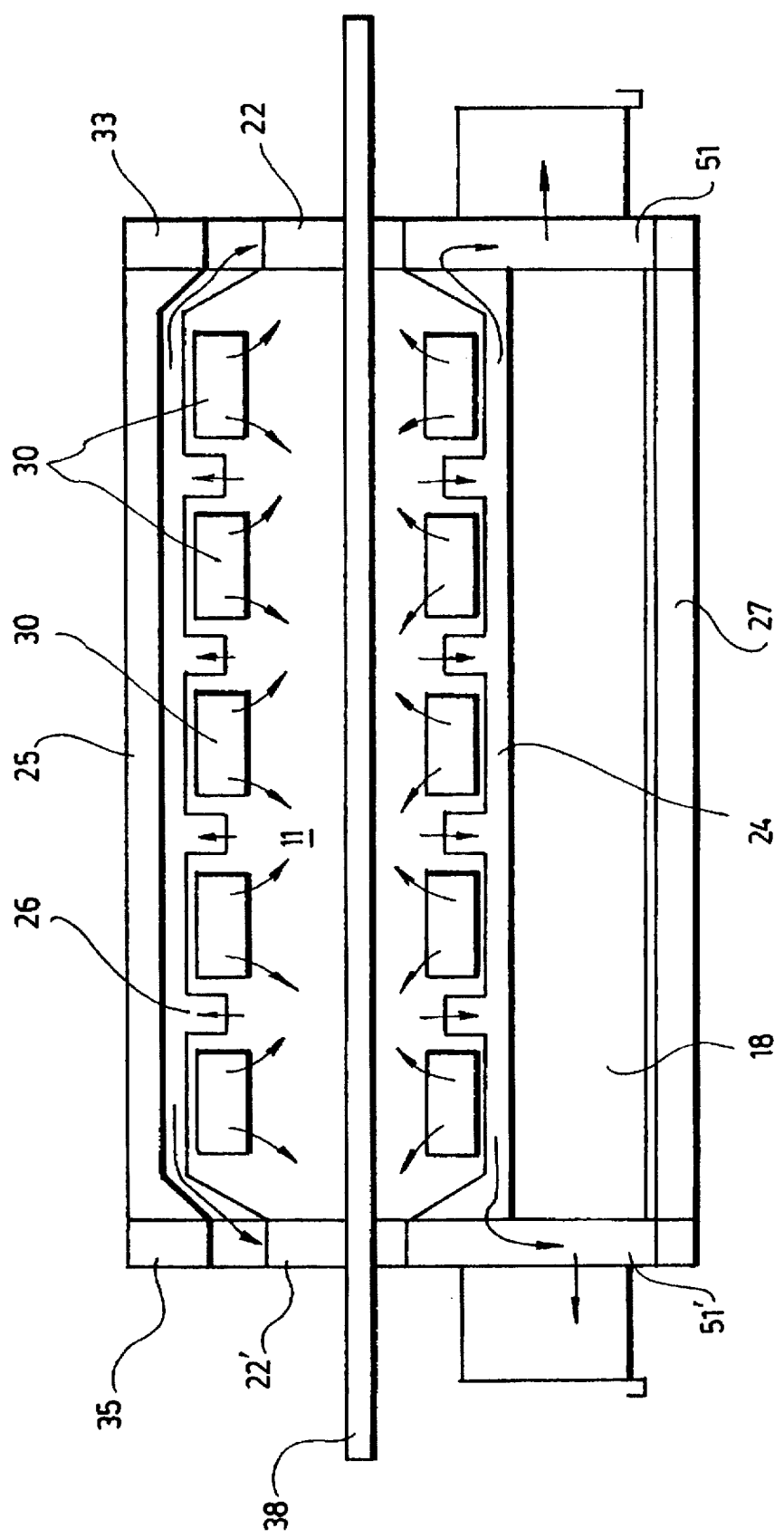
FIG. 2 is a partial cross section view of the oven of FIG. 1, taken along line II—II.
Figure 3:
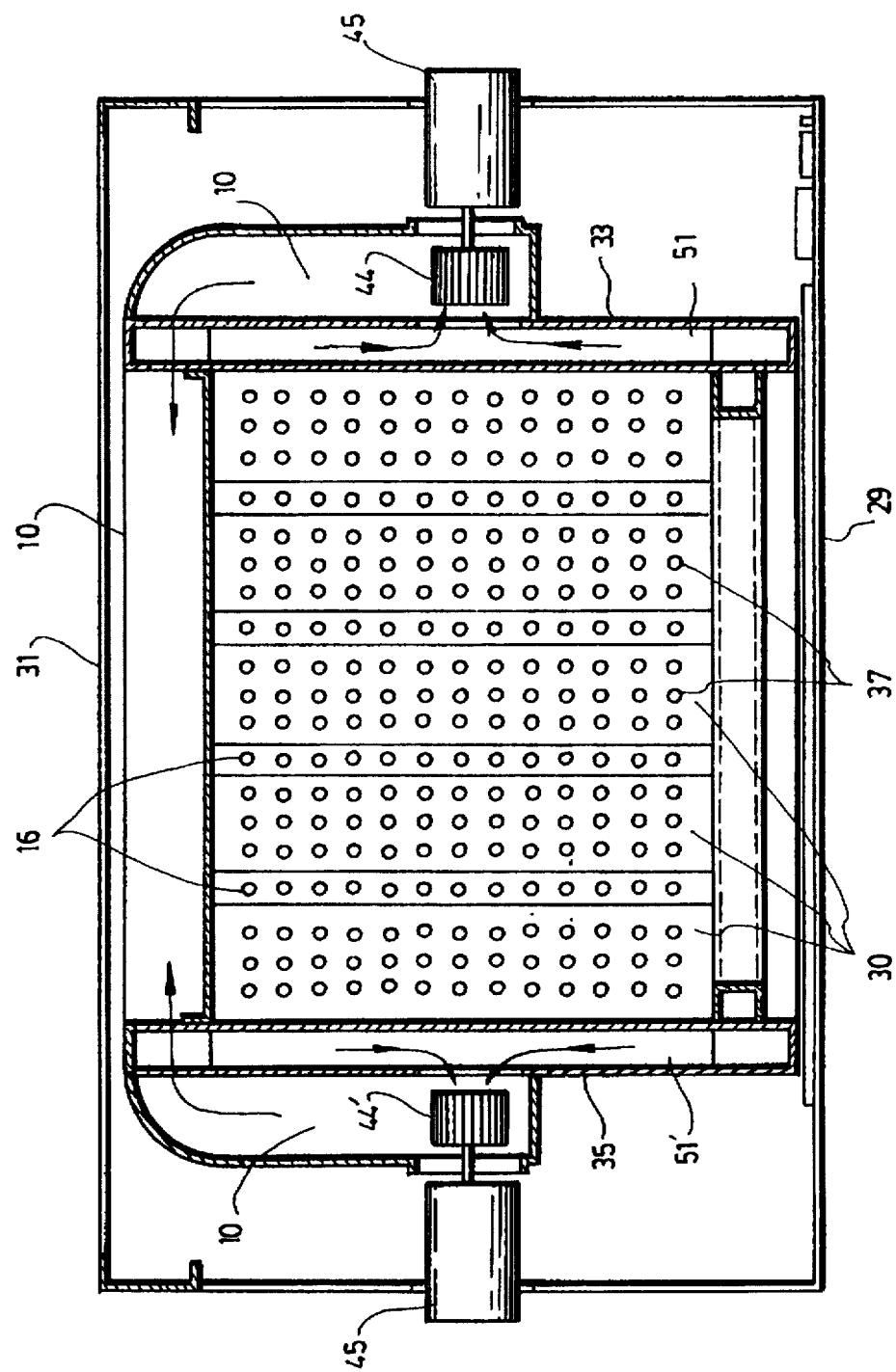
FIG. 3 is a partial cross section view of the oven of FIG. 1, taken along line III—III and in which the food conveyor is not shown.
Figure 4:
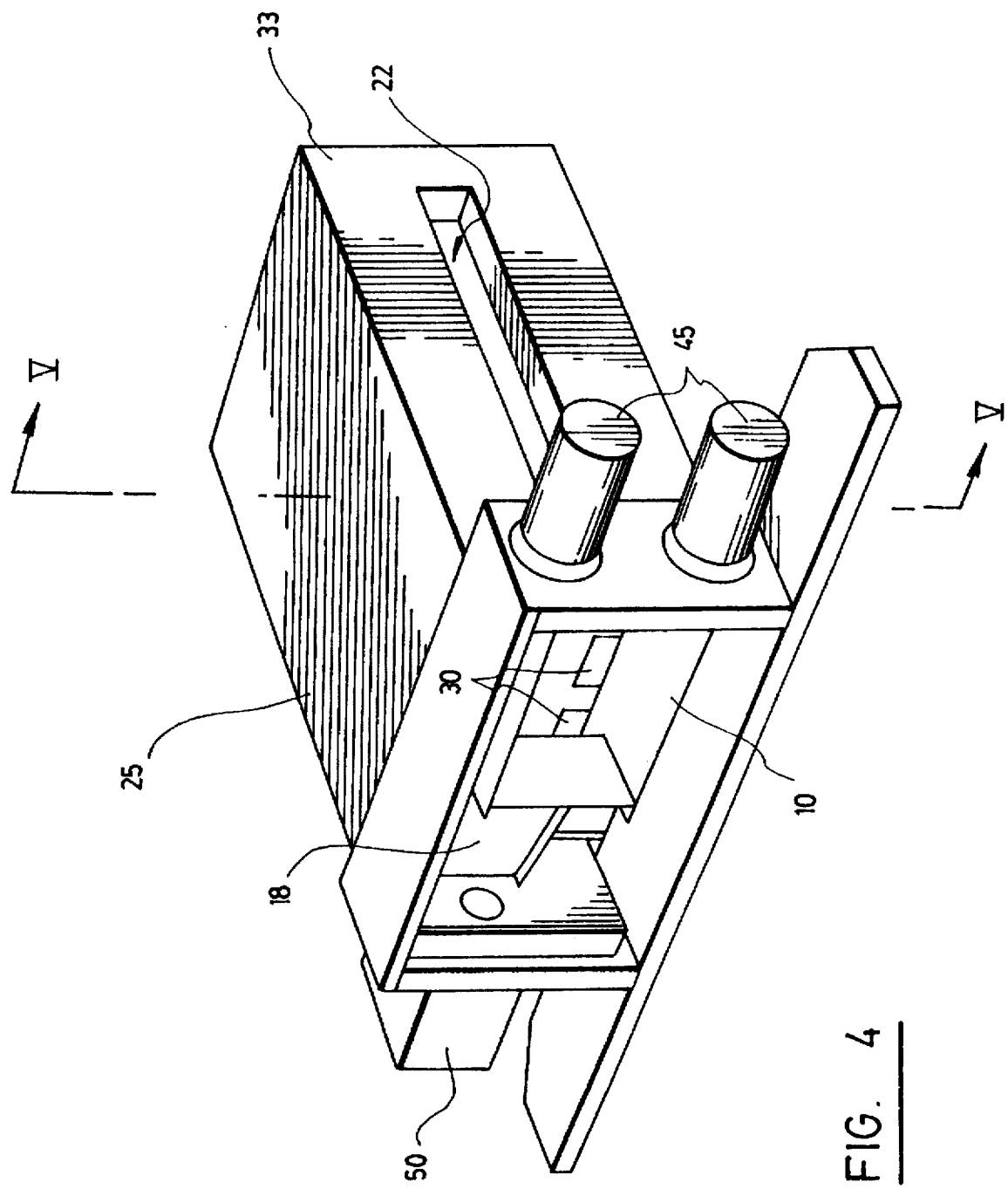
FIG. 4 is a perspective view of a heated air-circulating oven according to a second preferred embodiment of the invention with one of its side panels removed.
Figure 5:
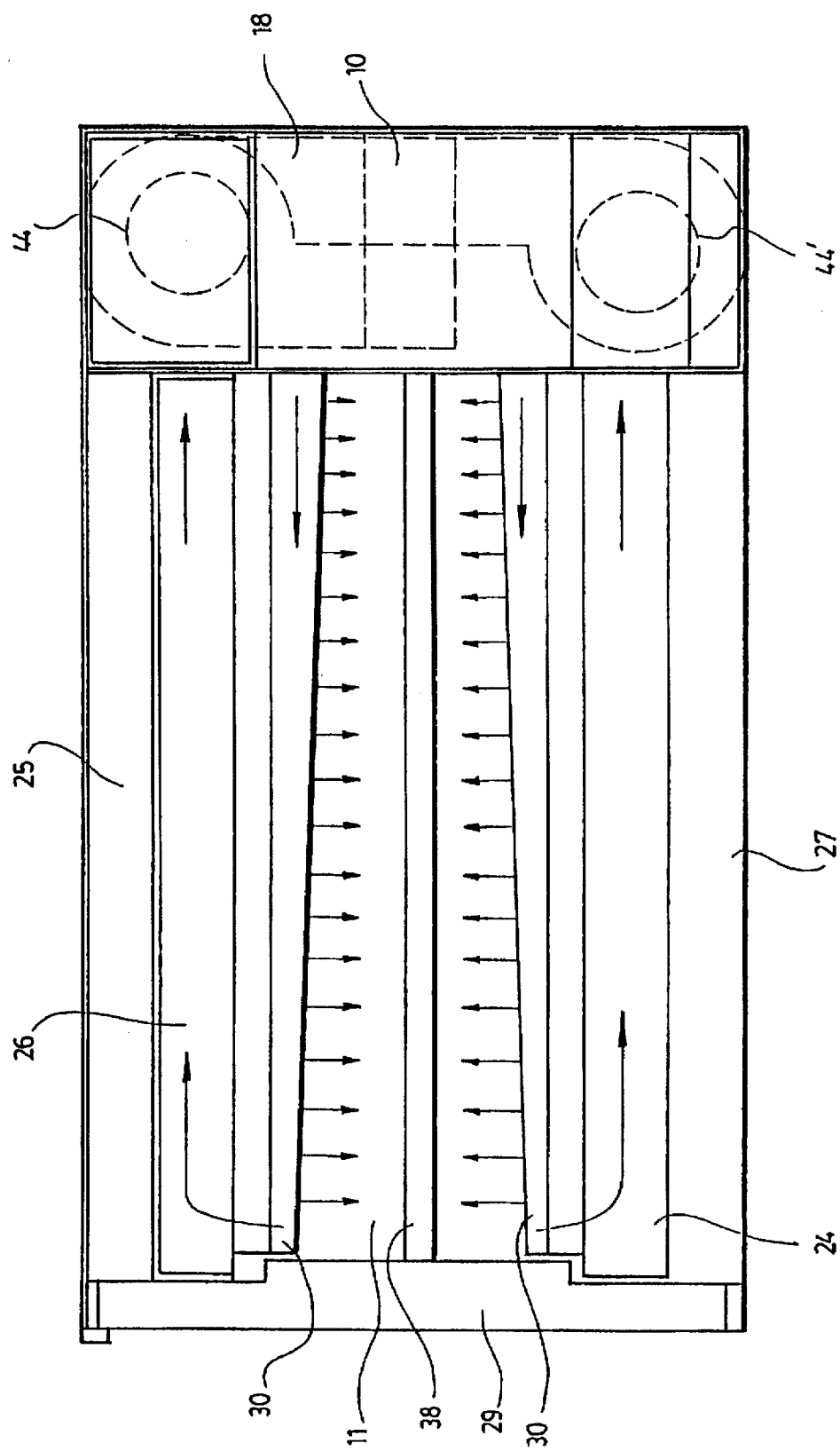
FIG. 5 is a cross section view of the oven of FIG. 4, which is taken along line V—V and in which the food-receiving conveyor is shown.
Figure 6:
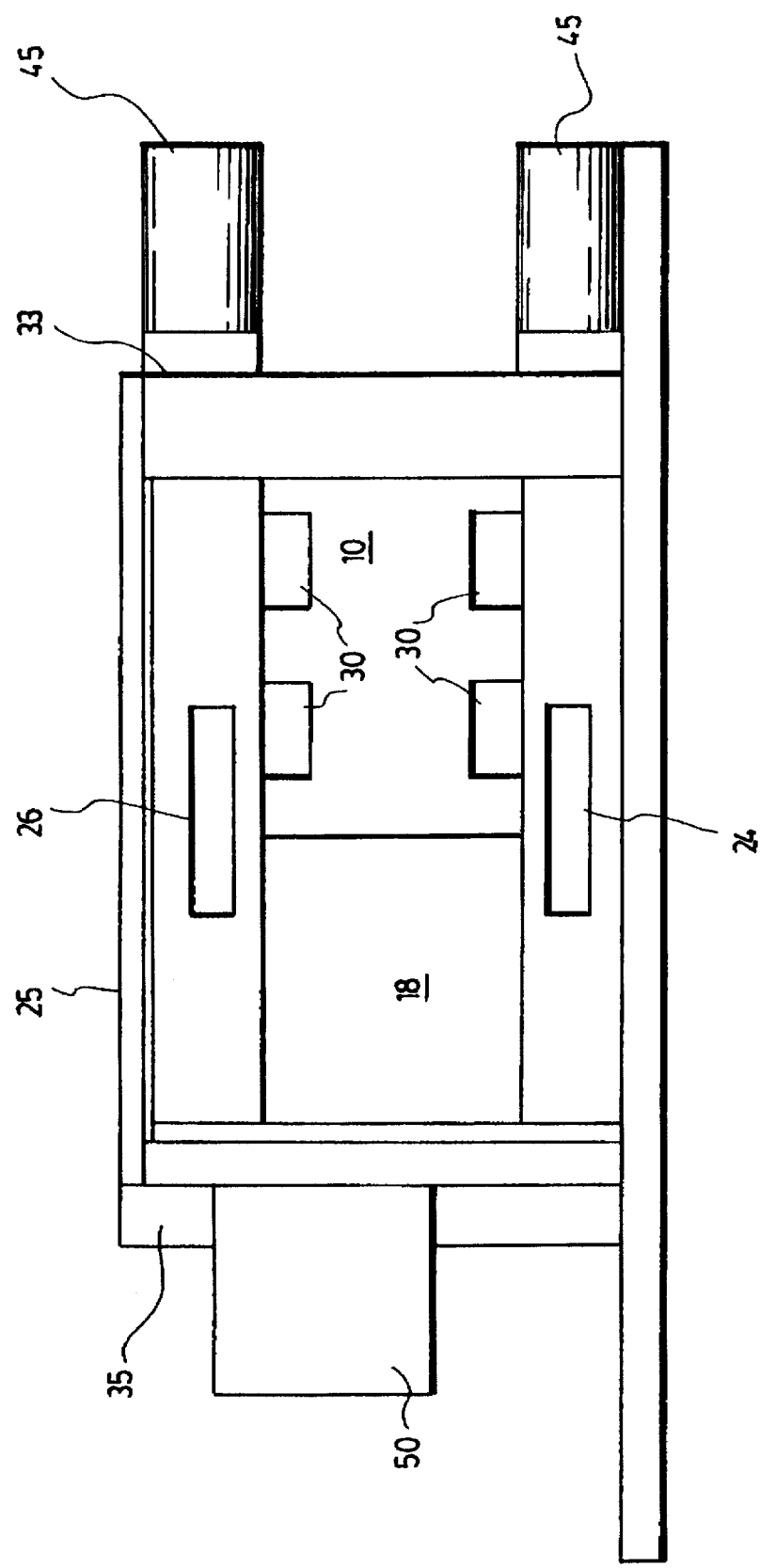
FIG. 6 is a rear elevational cross section view of the oven of FIG. 4.

FIGS. 1 to 3 show a heated air-circulating oven 9 according to the first preferred embodiment of the invention mentioned in the Summary of the invention. FIGS. 4 to 7 show a heated air-circulating oven 9 according to the second preferred embodiment of the invention mentioned hereinabove.

In both cases, means are provided to circulate air within a baking chamber 11 in which the food to be baked is inserted. More particularly, means are provided to draw air from the baking chamber 11 through a plurality of air suction chambers, to heat the air that has been so drawn outside of the baking chamber, and reinject the so heated air into the baking chamber 11.

First Preferred Embodiment

Thus, the oven 9 shown in FIGS. 1 to 3 comprises a baking chamber 11 having two opposite end walls 29, 31, opposite sidewalls 33, 35, a top wall 25 and a bottom wall 27. The baking chamber 11 is provided with two opposite openings 22, 22' in its opposite sidewalls, through which a food-receiving conveyor 38 passes to move food (not shown) to be baked at a given speed inside the baking chamber 11. Advantageously, the oven 9 may be provided with an access door 36 for easy loading of quick cook items such as pre-cooked meats.

As shown in FIG. 2, the oven 9 comprises an air suction chamber 24 (hereinafter called "first suction chamber") which is in open communication with the baking chamber 11. As is shown, such communication between the baking chamber 11 and the suction chamber 24 can be achieved via a plurality of apertures 16. Another air suction chamber 26 is in contact with the top wall 25 of the baking chamber 11 to allow a more uniform distribution of the air into the baking chamber 11. This other air suction chamber 26 is in open communication with the first air suction chamber 24 via at least one intermediate suction chamber 51. As is shown, two of these intermediate suction chambers 51, 51' may be provided, which are adjacent to the opposite sidewalls 33, 35. Of course, the other air suction chamber 26 is also in open communication with the baking chamber 11 via a plurality of apertures 16.

The oven 9 further comprises at least one blower 44, preferably driven by an electric motor 45, for drawing air from the baking chamber 11 through the suction chambers 24, 26. For more efficiency, the oven 9 may advantageously be provided with one or more other blowers 44' as shown in FIG. 3.

The air drawn from the baking chamber 11 through the suction chambers 24, 26 passes through a blowing chamber 10 which extends at least in part adjacent to one of the opposite end walls 31. The air drawn and blown by the blowers 44, 44' is then reinjected back into the baking chamber 11 via a plurality of blown air distributors 30 which are in open communication with the blowing chamber 10 and the baking chamber 11. Preferably, the blown air distributors 30 extend within the baking chamber 11 on the top and bottom walls 25, 27 thereof, from the one opposite end wall 31 to which the blowing chamber 11 is adjacent, to the other opposite end wall 29.

Figure 8:
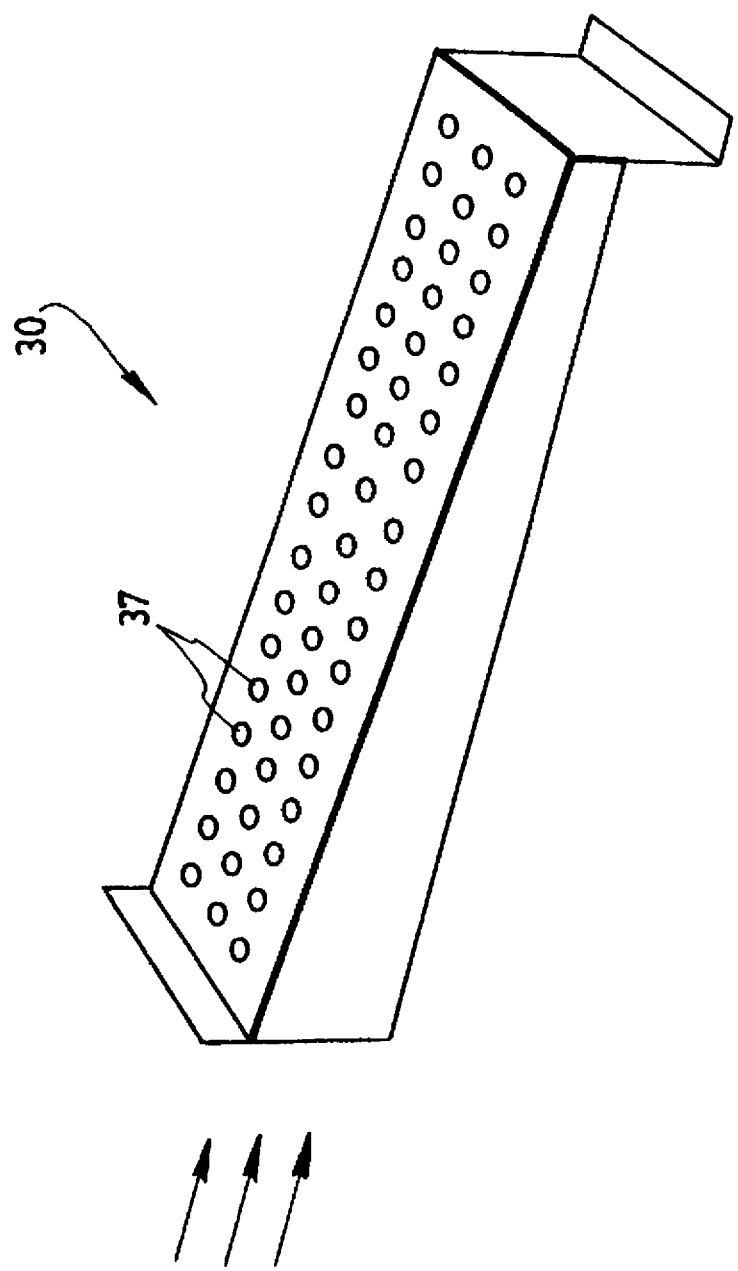
FIG. 8 is a perspective view of one of the blown air distributors used in the ovens shown in FIGS. 1 to 7.

As illustrated in FIG. 8, each of the blown air distributors 30 has a decreasing cross section over its length and is provided with a plurality of evenly spaced outlet openings 37. Advantageously, the apertures 16 allowing communication between the baking chamber 11 and the suction chambers 24, 26 are positioned so as not to face the outlet openings 37 of the blown air distributors 30.

As illustrated in FIG. 2, the oven 9 is also provided with a heating means which is external to the baking chamber 11. The purpose of this heating means is to heat the air which is drawn from the baking chamber 11 before it is blown back into the baking chamber 11. As is shown, the heating means may comprise a heating chamber 18 which extends across and beneath the first suction chamber 24 and which is operatively connected to the same so as to heat the air drawn through this air suction chamber 24. If desired, another heating chamber could advantageously extend over the other suction chamber 26 so as to heat the air passing through this other suction chamber 26.

As will be apparent to those skilled in the art, a gas conversion burner or an electrical power source (not shown) can be used for generating heat inside of the heating chamber 18.

In use, the heated air fed into the baking chamber 11 to bake the food is drawn out from the baking chamber 11 through the suction chambers 24, 26. In the suction chamber 24, it is heated. Then the air passes through the blowing chamber 10 and is then reinjected into the baking chamber 11. For the, purpose of clarification, arrows showing the air flow direction have been added to the figures.

Second preferred embodiment

The oven 9 according to the second preferred embodiment of the invention as shown in FIGS. 4 to 7 comprises essentially the same basic elements as described above in connection with the first preferred embodiment of the invention. As a matter of fact, the only difference between these two preferred embodiments, which will become more evident with the following description, is that in the second embodiment, the air is heated directly in the heating chamber 18, while in the first embodiment described hereinbefore, air is heated while passing through the suction chamber 24.

Thus, the oven 9 shown in FIGS. 4 to 7, like the one according to the first preferred embodiment, comprises two opposite end walls 29, 31, two sidewalls 33, 35, a top wall 25 and a bottom wall 27. It also comprises a baking chamber 11, two air suction chambers 24, 26, two blowers 44, 44', a blowing chamber 10, a plurality of blown air distributors 30 and a heating chamber 18. These elements have the same purpose or function as before. As a matter of fact, it is their positioning within the oven that makes the difference between the two embodiments.

As illustrated in FIGS. 4 to 7, the blowing chamber 10 is adjacent to one of the opposite end walls 31 and the heating means comprises a heating chamber 18 in open communication with the suction chambers 24, 26 and operatively connected to the blowing chamber 10. The air drawn by the blowers 44, 44' passes into the heating chamber 18 before passing through the blowing chamber 10. The air is thus heated while passing through the heating chamber 18.

Figure 7:
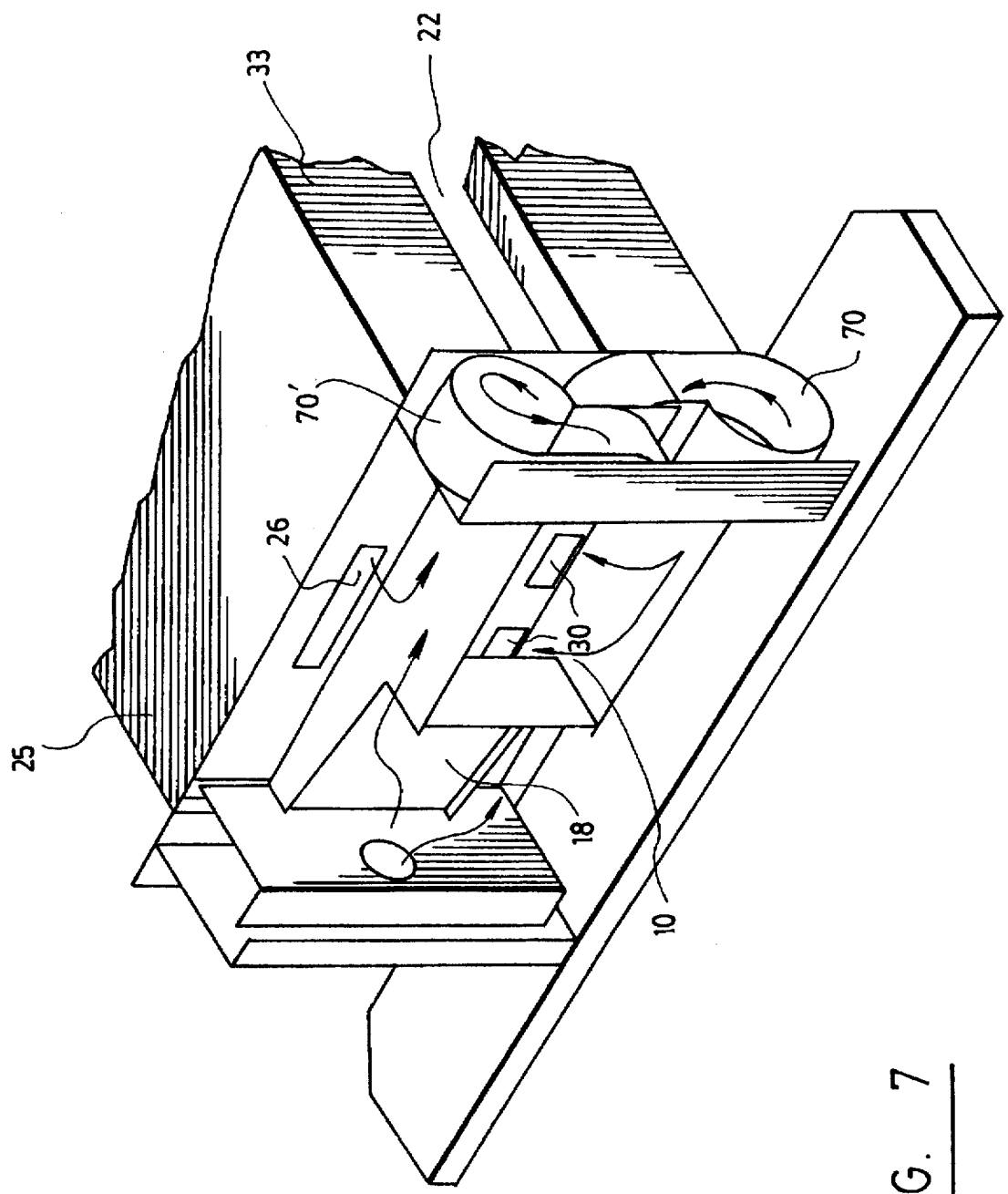
FIG. 7 is a partial view of FIG. 4 showing the rear end of the oven in more detail and the air flow direction.

In this embodiment, as shown in FIG. 7, the blowers 44, 44' are both mounted within the blowing chamber 10. One of the blower 44 is in communication with one suction chamber 26 and the other blower 44' is in communication with the other suction chamber 24. The blowing chamber 11 is also provided with deflectors 70, 70' for directing the air flow into the blowing chamber 11.

Preferably, the heating means comprises a gas conversion burner 50 for generating heat inside of the heating chamber 18.

Of course, the baking chamber may also have two opposite side openings 22, 22' through which a food-receiving conveyor passes so as to move the food to be baked at a given speed inside the baking chamber.

As shown in FIG. 1, the two preferred embodiments described hereinbefore may advantageously be provided with an electronic temperature control and with a variable speed control for the conveyor. These controls numbered 60 may be mounted on the front end side of the oven for an easy access.

Preferably also, in both cases, the heated air-circulating oven according to the present invention may be thermally insulated. Its structure can be made of stainless steel and incorporate legs.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

What is claimed is:

1. A heated air-circulating oven comprising:

a baking chamber in which food can be inserted for baking, said baking chamber having two opposite sidewalls, an end wall, a top wall and a bottom wall;

two air suction chambers in open communication with said baking chamber, one of said two air suction chambers is adjacent to the bottom wall of the baking chamber, the other one of said two air suction chambers is adjacent to the top wall of the baking chamber, both of said air suction chambers are in open communication with each other via at least one intermediate chamber adjacent to one of said opposite sidewalls, both of said air suction chambers being also in open communication with the baking chamber via a plurality of apertures operatively positioned onto said top and bottom wall;

at least one blower mounted outside the baking chamber for drawing air from said baking chamber through the suction chambers;

a blowing chamber at least in part adjacent to said end wall and in open communication with said two air suction chambers via said at least one blower and in which the air drawn by said at least one blower passes;

a plurality of blown air distributors extending within the baking chamber on the top and bottom walls thereof and being positioned so as to not face said plurality of apertures of the air suction chambers, said blown air distributors being in open communication with the blowing chamber and the baking chamber so as to reinject the air drawn and blown by said at least one blower back into the baking chamber; and heating means external to said baking chamber for heating the air which is drawn from the baking chamber before it is blown back into said baking chamber, said heating means comprising a heating chamber operatively connected to one of said two air suction chamber so as to heat the air drawn through said one air suction chamber.

2. The oven according to claim 1, wherein the blown air distributors are extending from the one opposite end wall to which the blowing chamber is adjacent, to the other opposite end wall, each of said blown air distributors having a decreasing cross-section over its length and being provided with a plurality of evenly spaced outlet openings.

3. The oven according to claim 2, comprising two of said at least one blower externally mounted onto opposite sidewalls of said baking chamber, each blower being operatively connected to said two air suction chambers and said blowing chamber.

4. The oven according to claim 3, wherein the baking chamber has two opposite end openings through which a food-receiving conveyor passes so as to move the food to be baked inside the baking chamber.

5. A heated air-circulating oven comprising:

a baking chamber in which food can be inserted for baking, said baking chamber having two opposite sidewalls, an end wall, a top wall and a bottom wall;

two air suction chambers in open communication with said baking chamber, one of said two air suction chambers is adjacent to the bottom wall of the baking chamber, the other one of said two air suction chambers is adjacent to the top wall of the baking chamber, both of said air suction chambers are in open communication with each other via at least one intermediate chamber adjacent to one of said opposite sidewalls, both of said air suction chambers being also in open communication with the baking chamber via a plurality of apertures operatively positioned onto said top and bottom wall;

two blowers mounted outside the baking chamber, for drawing air from said baking chamber through a corresponding air suction chamber, each of said blowers being respectively in communication with a corresponding suction chamber;

a blowing chamber at least in part adjacent to said end wall and in open communication with said two air suction chambers via said two blowers and in which the air drawn by said two blowers passes;

a plurality of blown air distributors in open communication with the blowing chamber and the baking chamber so as to reinject the air drawn and blown by said two blowers back into the baking chamber, said plurality of blown air distributors being positioned so as to not face said plurality of apertures extending within the baking chamber on the top and bottom walls thereof from the one opposite end wall to which the blowing chamber is adjacent, to the other opposite end wall, each of said blown air distributors having a decreasing cross-section over its length and being provided with a plurality of evenly spaced outlet openings; and heating means external to said baking chamber for heating the air which is drawn from the baking chamber before it is blown back into said baking chamber, said heating means comprising a heating chamber operatively connected to the air suction chamber adjacent to the bottom wall so as to heat the air drawn through said air suction chamber.

* * * * *